(12) United States Patent
Henderson

(10) Patent No.: US 8,150,265 B2
(45) Date of Patent: Apr. 3, 2012

(54) CARRIER CURRENT COMMUNICATION SYSTEM WITH INFRARED RECEIVER

(75) Inventor: Michael J. Henderson, Grass Valley, CA (US)

(73) Assignee: 2Wire, Inc., San Jose, CA (US)

( * ) Notice: Subject to any disclaimer, the term of this patent is extended or adjusted under 35 U.S.C. 154(b) by 516 days.

(21) Appl. No.: 12/406,655

(22) Filed: Mar. 18, 2009

(65) Prior Publication Data

US 2010/0239265 A1    Sep. 23, 2010

(51) Int. Cl.
*H04B 10/00* (2006.01)

(52) U.S. Cl. .................... 398/116; 398/115; 398/202

(58) Field of Classification Search .............. 398/116, 398/115, 202
See application file for complete search history.

(56) References Cited

U.S. PATENT DOCUMENTS 4,910,767 A * 3/1990 Brugliera et al. ........ 379/355.03

OTHER PUBLICATIONS

"IR Receiver for Data Communication," TEMIC Semiconductor GmbH, Heilbronn, Germany, U2538B, Rev. A2, Oct. 15, 1998, 7 pages.
"IR Preamplifier for Remote Control System," Analog Integrations Corporation, Hsinchu, Taiwan, AIC1863, DS-1863-01, Jan. 21, 2002, 8 pages.
"IR Receiver for Data Communication," Atmel Corporation, San Jose, California, USA, U2538B, Rev. 4717B-IRRC-09/05, Sep. 2005, 9 pages.
"X10 (industry standard)," Wikipedia, the free encyclopedia, downloaded from http://en.wikipedia.org/wiki/X10_(industry_standard), Mar. 16, 2009, 7 pages.

* cited by examiner

*Primary Examiner* — Kinam Park
(74) *Attorney, Agent, or Firm* — Head, Johnson & Kachigian P.C.

(57) ABSTRACT

Embodiments of a method and apparatus are described to transmit a data signal from a power supply unit, over existing direct current (DC) power transmission lines, to a residential gateway which includes an infrared (IR) receiver designed to receive optical signals. In one embodiment, the IR receiver is configured to receive a carrier current communication signal from the power supply unit over a pair of copper wires coupled to the IR receiver. The carrier current communication signals may be encoded by a transmission encoding logic circuit using pulse position modulation techniques. The received carrier current communication signals may be demodulated and decoded to reproduce an input data stream.

21 Claims, 5 Drawing Sheets

CARRIER CURRENT COMMUNICATION SYSTEM WITH INFRARED RECEIVER

TECHNICAL FIELD

This disclosure relates to the field of digital data communications and, in particular, to power line communications.

BACKGROUND

Typically, telecommunication systems that provide broadband access to residential customers contain a residential gateway which consists of an xDSL (any type of digital subscriber line generally communicated over copper lines) modem or xPON (any type of passive optical network generally communicated over optic fibers) interface combined with various local area networking (LAN) technologies to enable sharing the broadband access with other computers or devices within the residence. Wireless local area network (WLAN) standards and home phone line networking (HPNA) are examples of such LAN technologies. In addition, some telecommunication systems may provide a voice-over-internet-protocol (VOIP) feature to allow telephone calls via the broadband link. Some systems may, in addition to broadband access sharing, need to distribute broadband media content such as video streams into various locations within the residence.

Typically, the residential gateway is located inside the house. In certain cases, however, it may be desirable to locate the residential gateway outside the house at a network interface device (NID), such as for example, the intelligent Network Interface Device (iNID) made by 2Wire, Inc., of San Jose, Calif. An NID is the point of demarcation between the Unbundled Network Element (UNE) loop and the end user's inside wire. In general, there is often no external source of alternating current (AC) power accessible at the NID or iNID location. Consequently, powering the device from an isolated direct current (DC) power source inside the house is the generally viable option. DC power transmission lines are used to provide power to the outside device.

A significant problem in trying to locate the residential gateway at the NID or iNID is the problem of sending communication signals between the power supply unit (PSU) and the outside device. Conventional schemes for sending communication signals involve the installation of separate wires between the outside device and the power supply unit for the purpose of facilitating communication. These schemes often require creating additional holes in the exterior and/or interior walls of buildings. Additional labor and material expense is associated with this additional separate wiring.

Other conventional schemes may try to solve the problem of requiring additional separate wiring by making use of carrier current communications. Carrier current communications systems operate by impressing a modulated carrier signal on the existing DC power transmission wires. In a carrier current communications system, a transmitter in the power supply unit typically modulates a carrier signal with the desired data and transmits the modulated carrier signal across the power transmission lines. A receiver in the outside device receives the carrier waves and demodulates the carrier signal to extract the data signal. The data signal may then be used by the residential gateway as needed. One drawback of conventional carrier current communications systems is that the receivers and transmitters generally have a complex proprietary design making them expensive to implement.

BRIEF DESCRIPTION OF THE DRAWINGS

The present disclosure is illustrated by way of example, and not by way of limitation, in the figures of the accompanying drawings.

FIG. 2 illustrates a block diagram of a carrier current communications system including an infrared (IR) receiver according to one embodiment of the present invention.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

The following detailed description includes several modules, which will be described below. These modules may be implemented by hardware components, such as logic, or may be embodied in machine-executable instructions, which may be used to cause a general-purpose or special-purpose processor programmed with the instructions to perform the operations described herein. Alternatively, the operations may be performed by a combination of hardware and software.

Embodiments of a method and apparatus are described to transmit a data signal from a power supply unit, over existing direct current (DC) power transmission lines, to a residential gateway which includes an infrared (IR) receiver designed to receive optical signals. In one embodiment, the IR receiver is configured to receive a carrier current communication signal from the power supply unit over a pair of copper wires coupled to the IR receiver. The IR receiver may be a prefabricated integrated circuit including connection devices for a received input signal, an output signal, a supply voltage, a ground connection and several adjusting or tuning devices. Generally, the functional operation of the IR receiver is that an optical signal is received at a photodetector, typically a photodiode, and converted to an electrical signal. In one embodiment of the present invention, rather than coupling to a photodiode, the input connection of the IR receiver is coupled to the copper wires of the DC power transmission line through coupling circuitry. The received electrical signal is fed into an input circuit in the receiver and to signal processing circuitry. The receiver ultimately produces an output signal which is provided, for example, to a microcontroller for further processing. The IR receiver provides an inexpensive alternative to complex proprietary circuits.

Figure 1:
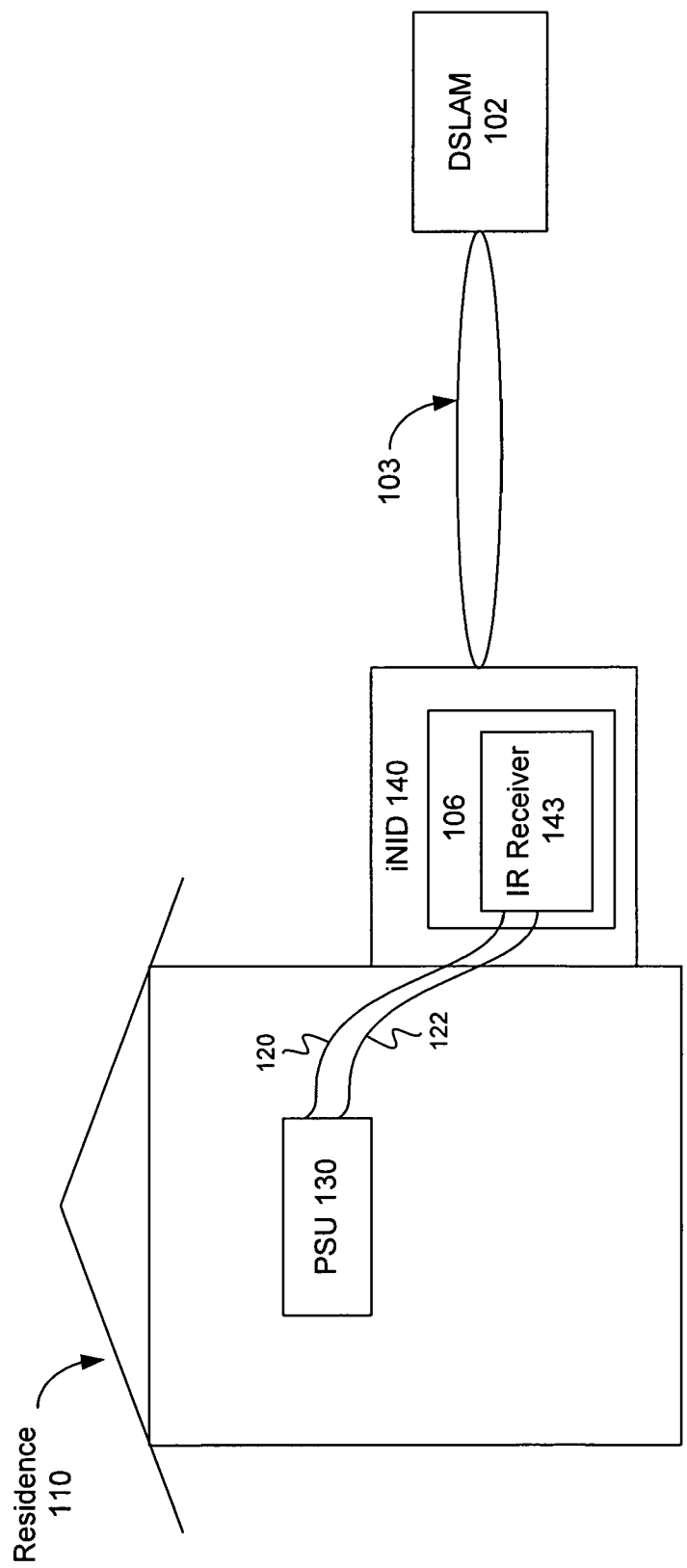
FIG. 1 illustrates a block diagram of a central office containing a Digital Subscriber Loop Access Multiplexer (DSLAM) sending communications across an Unbundled Network Element (UNE) loop to an intelligent Network Interface Device (iNID) according to one embodiment of the present invention.

FIG. 1 illustrates a block diagram of a central office containing a Digital Subscriber Loop Access Multiplexer (DSLAM) 102 sending communications across an Unbundled Network Element (UNE) loop 103 to an intelligent Network Interface Device (iNID) 140, according to one embodiment of the present invention. The DSLAM 102 sends communications to the iNID 140 located outside a residence 110. The iNID 140 includes a residential gateway 106 that routes various types of communications, such as data, voice, and video, into the residence 110. The residential gateway includes an IR receiver 143, which while normally configured to receive optical signals, in this embodiment is configured to receive carrier current communication signals over the DC power transmission lines 120 and 122.

A power supply unit (PSU) 130 located inside the residence 110 couples to a load unit via DC power transmission lines 120 and 122 to provide isolated (non-grounded DC power to the load. In this embodiment, the load unit is the iNID 140; however, in alternative embodiments the load unit may represent one or more other devices. The PSU 130 may be located close to a conventional power source such as a 120 volt alternating current (AC) outlet.

In one embodiment, the first DC power transmission line 120 is coupled to a positive terminal of the PSU 130. The second DC power transmission line 122 is coupled to a negative terminal of the PSU 130. An isolated DC signal is sent from the PSU 130 to the load 140 via the DC power transmission line pair.

In certain embodiments, it may be advantageous for the PSU 130 and the load 140 to exchange communication messages with each other. The communication messages may include, for example, monitoring information for components such as batteries or switches, control signals to activate light emitting diodes (LEDs) or audio alarms, or reset signals.

The design for the load 140 allows power to be delivered from a power supply unit that is located within a residence 110 to power the load 140 using DC power transmission lines. The DC power transmission lines can also be used to transmit the communication messages described above between the PSU 130 and the load 140 using a carrier current communication scheme. A carrier current communication scheme may operate by sending a modulated carrier signal over the DC power transmission lines that is received by IR receiver 143 in the load 140.

Figure 2:
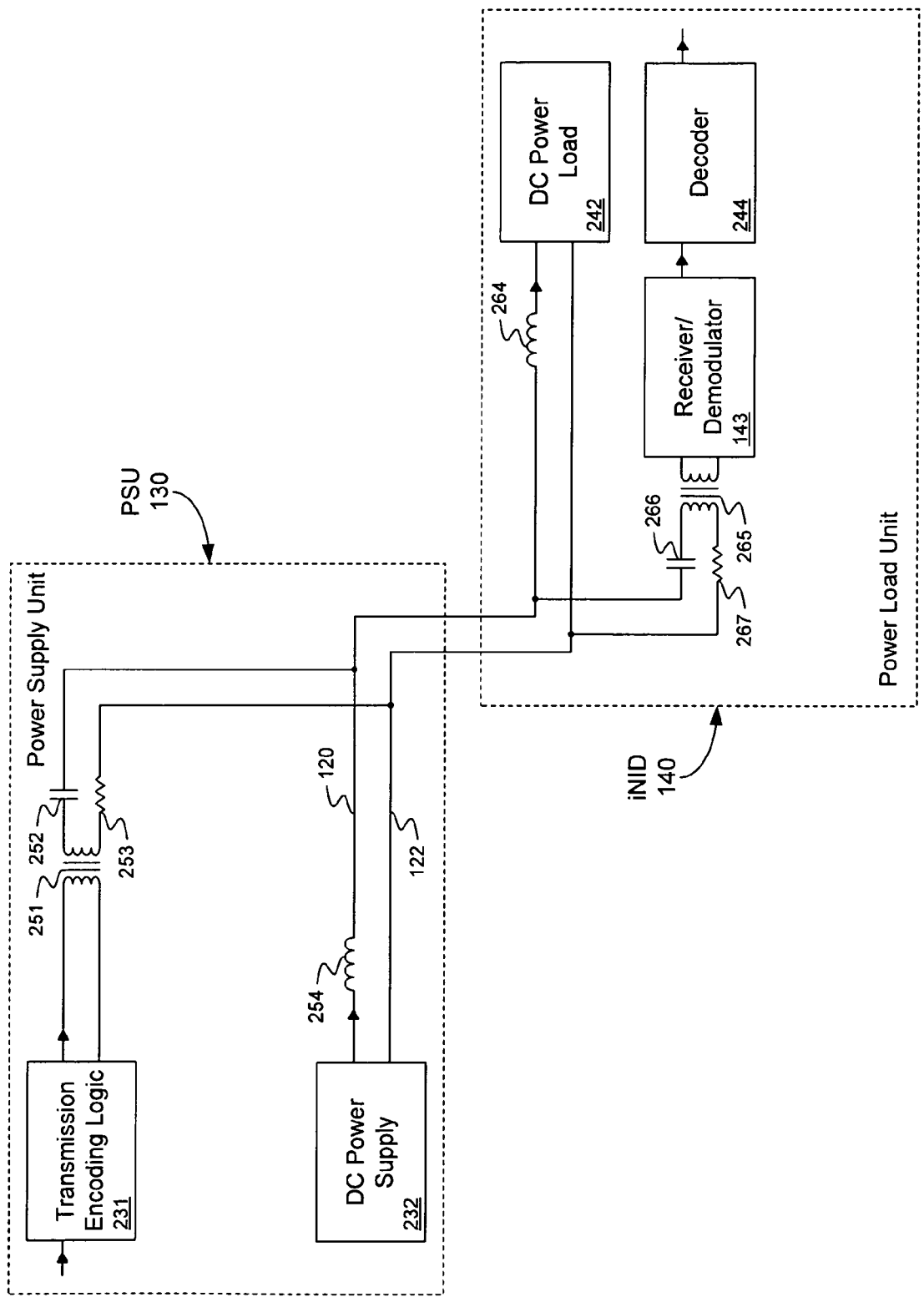
FIG. 2 illustrates

FIG. 2 illustrates a block diagram of a carrier current communications system including an infrared (IR) receiver according to one embodiment of the present invention. The carrier current communications system includes power supply unit 130 and power load unit 140 discussed above with respect to FIG. 1. Power supply unit 130 includes transmission encoding logic circuit 231 and DC power supply 232. Power load unit 140 includes DC power load 242, IR receiver 143 and decoder circuit 244. It should be understood that power supply unit 130 and power load unit 140 may include additional components or modules which are omitted from this description so as not to obscure the present invention.

DC power is provided by DC power supply 232 in PSU 130 to DC power load 242 in power load unit 140. In one embodiment, DC power load 242 is residential gateway 106 shown in FIG. 1. The DC power is transmitted via DC power transmission lines 120 and 122. In one embodiment, DC power transmission lines 120 and 122 are also used to transmit a carrier current communications signal from PSU 130 to power load unit 140. A digital data stream is received at an input of transmission encoding logic circuit 231. Transmission encoding logic circuit 231 modulates a carrier wave signal to include data from the input data stream. In one embodiment, transmission encoding logic circuit 231 uses a pulse position modulation technique to modulate the carrier wave. The operation of transmission encoding logic circuit 231 will be described further below with respect to FIG. 4.

In one embodiment, transmission encoding logic circuit 231 is coupled to DC power transmission lines 120 and 122 through a transformer 251. Transformer 251 includes a first winding and a second winding. The first winding is coupled to an output of transmission encoding logic 231. The second winding has a first end coupled to capacitor 252 and a second end coupled to resistor 253. Capacitor 252 and resistor 253 may also be coupled to DC power transmission lines 120 and 122 respectively. Transformer 251 effectively decouples transmission encoding logic circuit 231 from DC power supply 232. Transformer 251 prevents current from DC power supply 232 from flowing into transmission encoding logic circuit 231 and prevents the transmitter DC output current from influencing DC power supply 232. In one embodiment, transformer 251 has a winding ratio of approximately 1:1 and an inductance value of approximately 345 microhenries (µH). Capacitor 252 serves to prevent the transformer 251 from providing a DC burden on DC power transmission lines 120 and 122. In one embodiment, capacitor 252 has a capacitance value of approximately 0.01 microfarads (µF). Resistor 253 protects transmission encoding logic circuit 231 from a large transient voltage in DC power transmission lines 120 and 122 that may damage transmission encoding logic circuit 231. In one embodiment, resistor 253 has a resistance value of approximately 1 kiloohm (kΩ). In alternative embodiments, other values for transformer 251, capacitor 252 and resistor 253 may be used.

In one embodiment, inductor 254 is coupled between the output of DC power supply 232 and DC power transmission line 120. Inductor 254 stops the signal imposed on DC power transmission line 120 by transmission encoding logic circuit 231 from being dissipated by the relatively low impedance of DC power supply 232. Inductor 264 is similarly coupled and serves the same purpose for DC power load 242. In one embodiment, inductors 254 and 264 have an inductance value of approximately 220 µH, however, in alternative embodiments, inductors 254 and 264 have other inductance values.

In power load unit 140, IR receiver 143 is coupled to DC power transmission lines 120 and 122 through a transformer 265. Rather than being configured to receive an optical signal, IR receiver 143 is configured to receive a carrier current communication signal sent via transmission lines 120 and 122. Transformer 265 includes a first winding and a second winding. The first winding is coupled to an input of DC power load 242 and the second winding has a first end coupled to capacitor 266 and a second end coupled to resistor 267. Capacitor 266 and resistor 267 may also be coupled to DC power transmission lines 120 and 122, respectively. Transformer 265, capacitor 266 and resistor 267 serve a similar purpose and may have similar values as transformer 251, capacitor 252 and resistor 253, respectively.

IR receiver 143 receives the modulated carrier current communication signal from DC power transmission lines 120 and 122. Additionally, IR receiver 143 demodulates the received signal to form a binary voltage waveform. The binary voltage waveform is received at an input of decoder circuit 244. Decoder circuit 244 decodes the waveform to reproduce the digital data stream initially received by transmission encoding logic circuit 231. The operation of decoder circuit 244 will be discussed further below with respect to FIG. 5.

Figure 3:
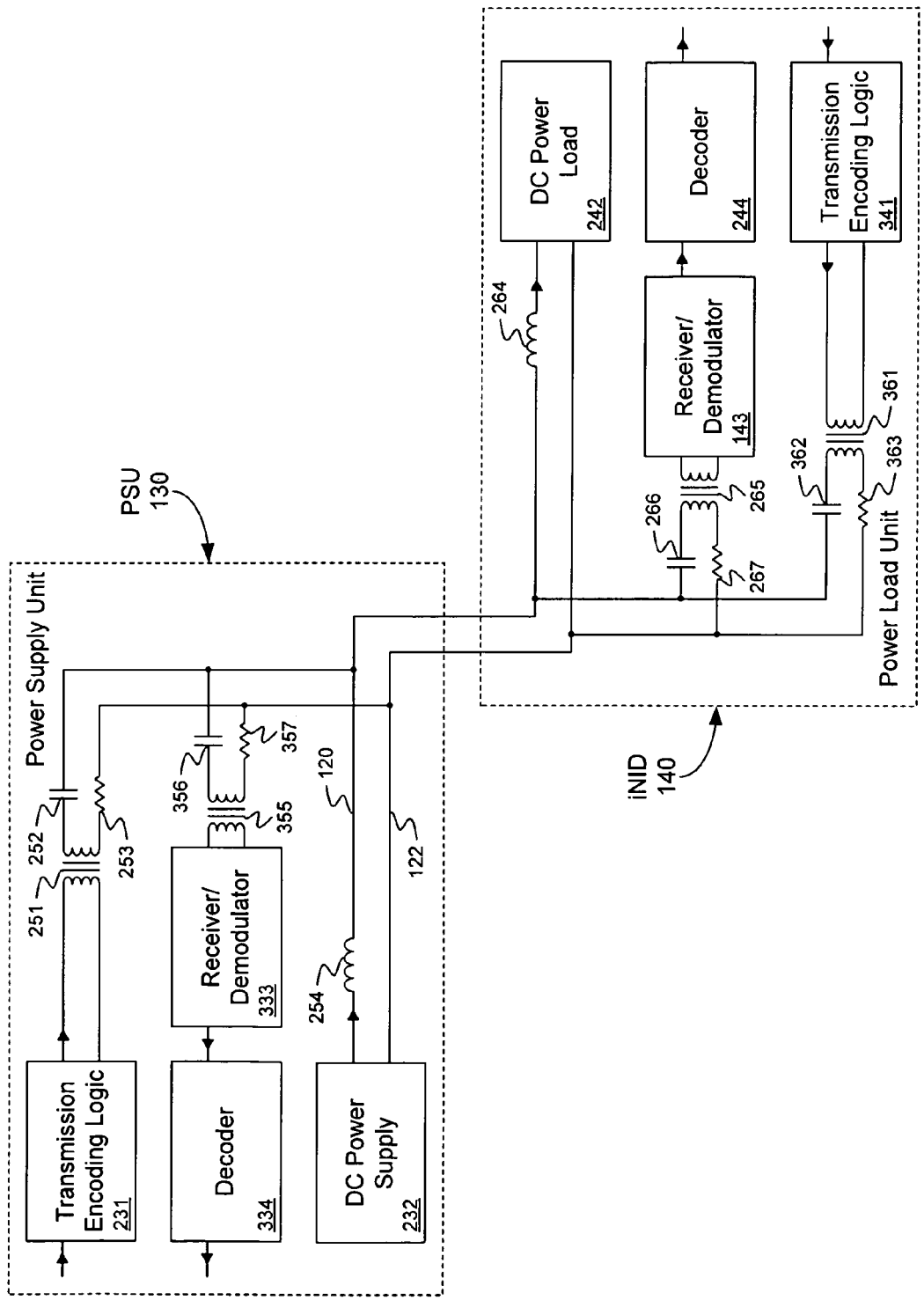
FIG. 3 illustrates a block diagram of a half duplex carrier current communications system including an infrared (IR) receiver according to one embodiment of the present invention.

FIG. 3 illustrates a block diagram of a half duplex carrier current communications system including an infrared (IR) receiver according to one embodiment of the present invention. The half duplex carrier current communications system includes power supply unit 130 and power load unit 140 as described above with respect to FIGS. 1 and 2. In this embodiment, both power supply unit 130 and power load unit 140 include a transmission encoding logic circuit 331, 341, a DC power supply 332 or a DC power load 342, an IR receiver 333, 143, and a decoder circuit 334, 344. The half duplex implementation operates similarly to the system of FIG. 2 except that communication is possible in both directions (i.e., from PSU 130 to power load unit 140 or from power load unit 140 to PSU 130) since both units include a transmitter and receiver.

The half duplex carrier current communications system includes transformers 251, 355, 361 and 265, capacitors 252, 356, 362 and 266, resistors 253, 357, 363 and 267, and inductors 254 and 264. These components serve a similar purpose and may have similar values as the corresponding components discussed above with respect to FIGS. 1 and 2.

Figure 4:
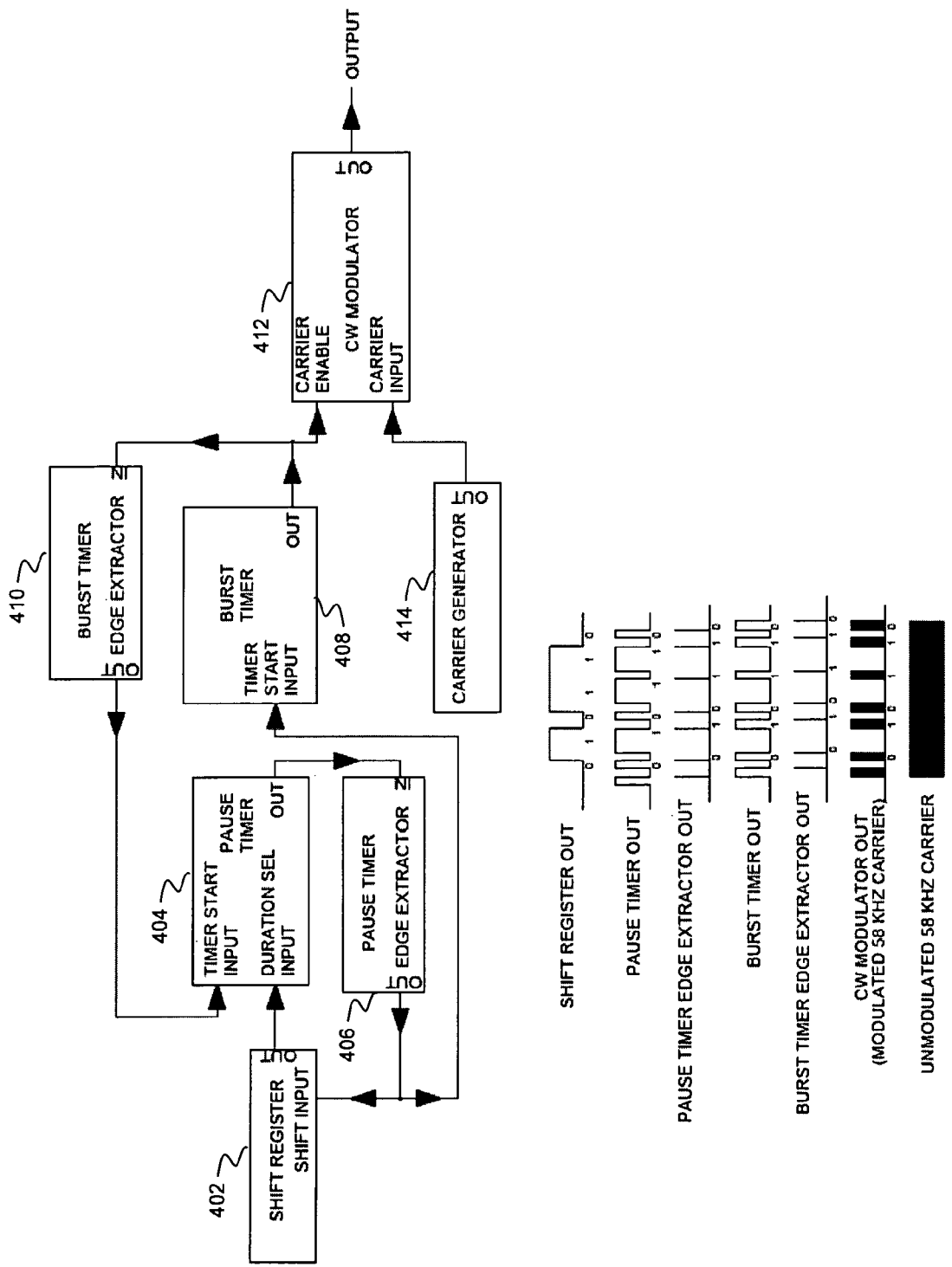
FIG. 4 illustrates the operation of a transmission encoding logic circuit according to one embodiment of the present invention.

FIG. 4 illustrates the operation of a transmission encoding logic circuit according to one embodiment of the present invention. The encoder functionality may be implemented in a number of ways including in software executed by a microprocessor, in a programmable logic device, or in an application specific integrated circuit (ASIC). In one embodiment, the encoder implements a pulse position modulation encoding scheme. In one embodiment, the encoder is transmission encoding logic circuit 231 shown in FIGS. 2 and 3 or transmission encoding logic circuit 341 shown in FIG. 3.

The encoder receives an input data stream that is stored in register 402. The input data stream may be in a number of formats, including for example, a parallel data stream or a serial data stream. The input data stream is read out of register 402 and into pause timer 404. Pause timer 404 selects between two values for a pause length based on the input data. In one embodiment, a short pause represents a zero bit and a long pause represents a one bit. The pause timer output is sent to pause timer edge extractor 406. Pause timer edge extractor 406 measures each falling edge in the pause timer output signal and creates a short pulse that will be used trigger a burst timer pulse. The pause timer edge extractor 406 feeds burst timer 408. Each short pulse is used to trigger the start of a longer pulse in the burst timer output. The burst timer output is fed to the burst timer edge extractor 410 which measures each falling edge of the burst timer output and signals the pause timer when each pulse ends, thus signaling the start of a new pause. The burst timer output is also fed to carrier wave modulator 412 which modulates a carrier wave received from carrier generator 414 to include the burst timer output signal. In one embodiment, the carrier wave is a 58 kilohertz (kHz) sine wave; however, in alternative embodiments another carrier wave may be used.

Figure 5:
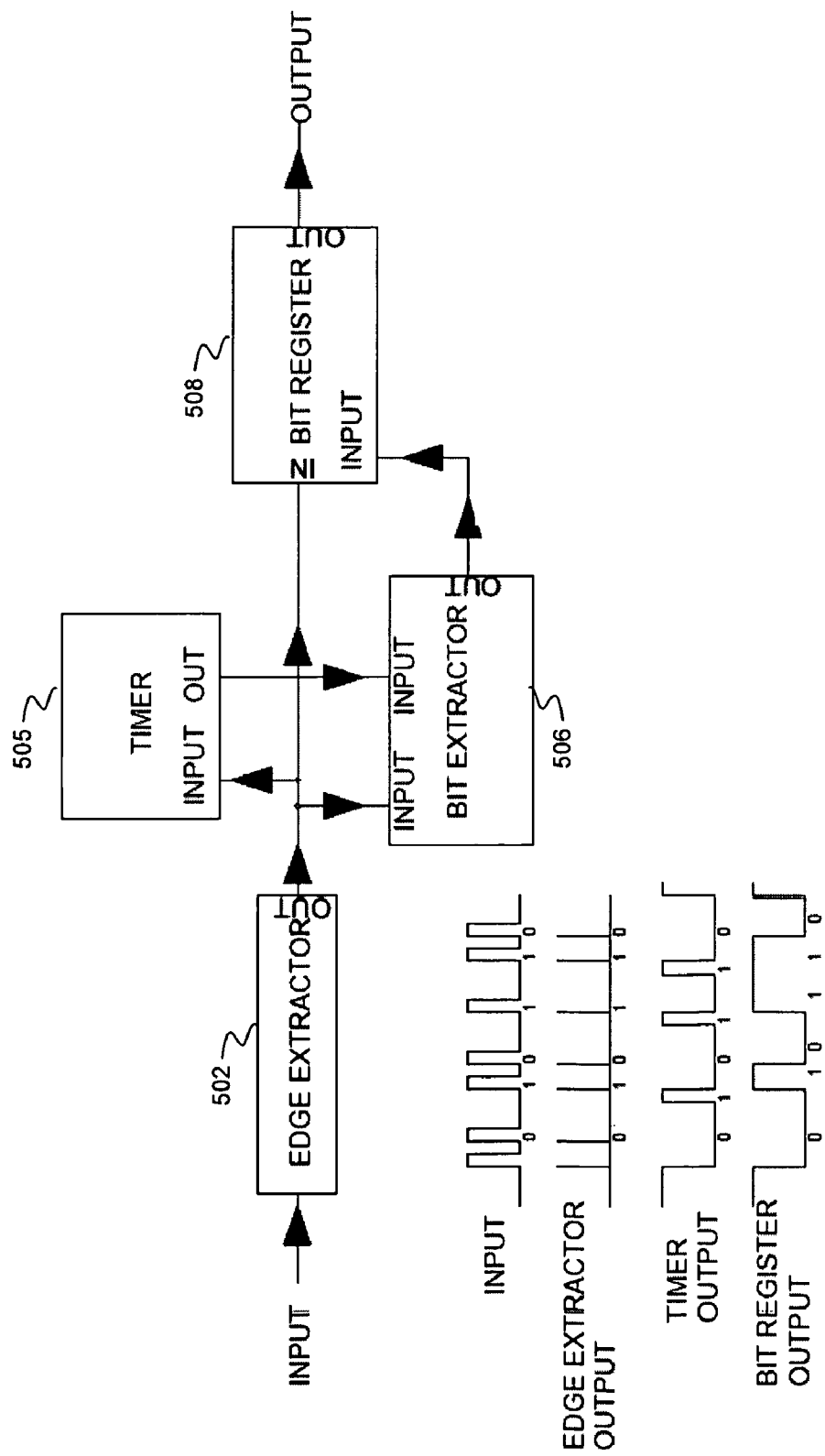
FIG. 5 illustrates the operation of a decoder circuit according to one embodiment of the present invention.

FIG. 5 illustrates the operation of a decoder circuit according to one embodiment of the present invention. In one embodiment, the decoder may be decoder circuit 244 shown in FIGS. 2 and 3 or decoder circuit 334 shown in FIG. 3. The decoder receives a binary voltage waveform from the output of an IR receiver. The binary voltage waveform is received at edge extractor 502. Edge extractor 502 measures the leading edge of every pulse in the received waveform. Edge extractor 502 feeds timer 504 which selects between two values based on the time between edge pulses. In one embodiment, a short pause represents a zero bit and a long pause represents a one bit. Bit extractor 506 interprets the timer output and feeds bit register 508 with the data stream. The output of bit register 508 matches the initially encoded digital data stream and may be used by the unit encompassing the decoder as needed.

The digital processing device(s) described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:
1. An apparatus comprising:
a power supply unit;
a power load unit coupled to the power supply unit through a direct current (DC) power transmission line pair; and
means for receiving a carrier current communication signal, sent from the power supply unit over the DC power transmission line pair, at an infrared (IR) receiver in the power load unit, wherein the IR receiver is designed to receive optical signals.

2. The apparatus of claim 1, wherein the means for receiving comprises:
 a first transformer having a first winding and a second winding, wherein the first winding is coupled to an input port of the IR receiver;
 a first capacitor coupled to a first end of the second winding of the first transformer; and
 a first resistor coupled to a second end of the second winding of the first transformer.

3. A method comprising:
 transmitting a carrier current communication signal from a power supply unit via a direct current (DC) power transmission line pair; and
 receiving the carrier current communication signal at an infrared (IR) receiver in a power load unit, wherein the IR receiver is coupled to the DC power transmission line pair.

4. The method of claim 3, further comprising:
 receiving an input data stream at a transmission encoding logic circuit in the power supply unit and modulating a carrier wave signal to include data from the input data stream using a pulse position modulation technique.

5. The method of claim 4, wherein receiving the carrier current communication signal comprises receiving the modulated carrier wave signal at the IR receiver.

6. The method of claim 5, further comprising:
 demodulating the received modulated carrier wave signal to form a binary voltage waveform.

7. The method of claim 6, further comprising:
 decoding the binary voltage waveform to reproduce the input data stream.

8. A carrier current communications system, comprising:
 a power supply unit:
 a power load unit coupled to the power supply unit through a direct current (DC) power transmission line pair, wherein the power load unit comprises an infrared (IR) receiver coupled to the DC power transmission line pair and configured to receive carrier current communication signals.

9. The carrier current communications system of claim 8, wherein the power load unit comprises:
 a first transformer having a first winding and a second winding, wherein the first winding is coupled to an input port of the IR receiver;
 a first capacitor coupled to a first end of the second winding of the first transformer; and
 a first resistor coupled to a second end of the second winding of the first transformer.

10. The carrier current communications system of claim 9, wherein the DC power transmission line pair comprises a first DC power transmission line coupled to the first capacitor and a second DC power transmission line coupled to the first resistor.

11. The carrier current communications system of claim 10, wherein the power load unit further comprises:
 a decoder circuit having an input coupled to an output of the IR receiver.

12. The carrier current communications system of claim 11, wherein the power supply unit comprises a transmission encoding logic circuit coupled to the DC power transmission line pair.

13. The carrier current communications system of claim 12, wherein the power supply unit further comprises:
 a second transformer having a first winding and a second winding, wherein the first winding is coupled to an output port of the transmission encoding logic circuit;
 a second capacitor coupled to a first end of the second winding of the second transformer; and
 a second resistor coupled to a second end of the second winding of the second transformer.

14. The carrier current communications system of claim 13, wherein the second capacitor is coupled to the first DC power transmission line and the second resistor is coupled to the second DC power transmission line.

15. The carrier current communications system of claim 12, wherein the transmission encoding logic circuit is configured to modulate a carrier wave signal to include data from a received input data stream using a pulse position modulation technique.

16. The carrier current communications system of claim 12, wherein the power supply unit further comprises:
 a DC power supply coupled to the DC power transmission line pair.

17. The carrier current communications system of claim 16, wherein the power supply unit further comprises:
 a first inductor coupled between the DC power supply and the first DC power transmission line.

18. The carrier current communications system of claim 11, wherein the power load unit further comprises:
 a DC power load coupled to the DC power transmission line pair.

19. The carrier current communications system of claim 18, wherein the power load unit further comprises:
 a second inductor coupled between the DC power load and the first DC power transmission line.

20. The carrier current communications system of claim 19 wherein the power load unit further comprises:
 a second transmission encoding logic circuit;
 a third transformer having a first winding and a second winding, wherein the first winding is coupled to an output port of the second transmission encoding logic circuit;
 a third capacitor coupled to a first end of the second winding of the third transformer; and
 a third resistor coupled to a second end of the second winding of the third transformer.

21. The carrier current communications system of claim 20, wherein the power supply unit further comprises:
 a second IR receiver;
 a second decoder coupled to an output of the second IR receiver;
 a fourth transformer having a first winding and a second winding, wherein the first winding is coupled to an input port of the second IR receiver;
 a fourth capacitor coupled to a first end of the second winding of the fourth transformer; and
 a fourth resistor coupled to a second end of the second winding of the fourth transformer.

* * * * *